US011343231B2

(12) United States Patent
Deshpande et al.

(10) Patent No.: US 11,343,231 B2
(45) Date of Patent: May 24, 2022

(54) SECURITY CONTEXT AWARE NANO-SEGMENTATION FOR CONTAINER BASED MICROSERVICES

(71) Applicant: VMWARE, INC., Palo Alto, CA (US)

(72) Inventors: Prahalad Deshpande, Pune (IN); Nikhil Bhalerao, Pune (IN); Atul Jadhav, Pune (IN); Abhijit Sharma, Pune (IN); Shashank Ranjan, Pune (IN)

(73) Assignee: VMWARE, INC., Palo Alto, CA (US)

( * ) Notice: Subject to any disclaimer, the term of this patent is extended or adjusted under 35 U.S.C. 154(b) by 237 days.

(21) Appl. No.: 16/547,634

(22) Filed: Aug. 22, 2019

(65) Prior Publication Data

US 2021/0006543 A1 Jan. 7, 2021

(30) Foreign Application Priority Data

Jul. 4, 2019 (IN) .............................. 201941026800

(51) Int. Cl.
*H04L 29/06* (2006.01)
(52) U.S. Cl.
CPC ...... *H04L 63/0263* (2013.01); *H04L 63/0236* (2013.01); *H04L 63/20* (2013.01)
(58) Field of Classification Search
CPC .. H04L 63/0263; H04L 63/20; H04L 63/0236
See application file for complete search history.

(56) References Cited

U.S. PATENT DOCUMENTS

| 9,521,115 | B1* | 12/2016 | Woolward | .......... H04L 63/1416 |
| 9,819,699 | B1* | 11/2017 | Nenov | ..................... H04L 63/20 |
| 10,698,714 | B2* | 6/2020 | Krishnamurthy | ... G06F 9/45558 |
| 10,701,104 | B2* | 6/2020 | Malkov | ............... G06F 9/45558 |
| 10,719,369 | B1* | 7/2020 | Aithal | ................. G06F 9/45558 |
| 2016/0359872 | A1* | 12/2016 | Yadav | ................. H04L 63/1425 |
| 2017/0364702 | A1* | 12/2017 | Goldfarb | ................ H04L 63/14 |
| 2018/0063048 | A1* | 3/2018 | Patel | ....................... H04L 51/06 |
| 2018/0109562 | A1* | 4/2018 | Nenov | ..................... H04L 67/32 |
| 2018/0181763 | A1* | 6/2018 | Gunda | .................... G06F 21/50 |
| 2018/0367398 | A1* | 12/2018 | Pani | .................... H04L 41/0873 |
| 2018/0367413 | A1* | 12/2018 | Kompella | ............... H04L 41/22 |

(Continued)

OTHER PUBLICATIONS

Application Security Software—AppDefense, https://www.vmware.com/products/appdefense.html.

(Continued)

*Primary Examiner* — Cheng-Feng Huang
(74) *Attorney, Agent, or Firm* — Patterson & Sheridan, LLP

(57) ABSTRACT

The present disclosure provides an approach for creating one or more firewall rules to regulate communication between containers. The approach includes calculating a trust score for each container. To generate a rule for any two containers, a difference between the trust scores is computed, and if the difference in trust levels is too large, then the more trustworthy container is not allowed to communicate with the less trustworthy container. If the difference in trust scores is not too large, then the trustworthy container is allowed to communicate with the other trustworthy container, or an untrustworthy container is allowed to communicate with another untrustworthy container.

20 Claims, 5 Drawing Sheets

(56) References Cited

U.S. PATENT DOCUMENTS

| | | | |
|---|---|---|---|
| 2019/0081852 A1* | 3/2019 | Nazar | H04L 41/0613 |
| 2019/0081871 A1* | 3/2019 | Nazar | H04L 41/142 |
| 2020/0067801 A1* | 2/2020 | McCormick | H04L 63/0227 |
| 2020/0097662 A1* | 3/2020 | Hufsmith | H04L 67/10 |
| 2020/0177549 A1* | 6/2020 | Barton | H04L 63/0263 |
| 2020/0225964 A1* | 7/2020 | Soman | H04L 63/02 |
| 2020/0236037 A1* | 7/2020 | Shu | H04L 43/026 |
| 2020/0336457 A1 | 10/2020 | Sharma et al. | |

OTHER PUBLICATIONS

Creating and Using Epoch Maps, https://docs.epoch.nutanix.com/tutorials/creating-and-using-maps/.

Fulton, Scott M., III, No Agents Needed to Monitor Containers, Says Sysdig, Just Linux Kernal Changes, Jul. 17, 2015, https://thenewstack.io/no-agents-needed-to-monitor-containers-says-sysdig-just-linux-kernal-changes/.

Holmes, Wade, Micro-Segmentation Defined—NSX Securing "Anywhere"—Part 1, Jun. 3, 2016: https://blogs.vmware.com/networkvirtualization/2016/06/micro-segmentation-defined-nsx-securing-anywhere.html/.

Jerbi, Amir, Network Nano-Segmentation for Container Security in Aqua 2.0, Feb. 2, 2017, https://blog.aquasec.com/network-nanosegmentation-for-container-security-in-aqua-2.0.

Simeonov, Yasen, Kubernetes Container Networking with NSX-T Data Center Deep Dive, Vmware, Inc., NET1677BU, Vmworld 2018 Content, https://cms.vmworldonline.com/event_data/10/session_notes/NET1677BU.pdf.

\* cited by examiner

SECURITY CONTEXT AWARE NANO-SEGMENTATION FOR CONTAINER BASED MICROSERVICES

RELATED APPLICATIONS

Benefit is claimed under 35 U.S.C. 119(a)-(d) to Foreign Application Serial No. 201941026800 filed in India entitled "SECURITY CONTEXT AWARE NANOSEGMENTATION FOR CONTAINER BASED MICROSERVICES", on Jul. 4, 2019, by VMWARE, Inc., which is herein incorporated in its entirety by reference for all purposes.

CROSS-REFERENCE TO RELATED APPLICATIONS

This application is related to U.S. application Ser. No. 16/436,930, titled "RECOMMENDING NETWORK NANO-SEGMENTATION FOR MICROSERVICES USING FLOW ANALYSIS," filed on Jun. 11, 2019, the entire contents of which is hereby incorporated by reference herein.

BACKGROUND

A computing system including a plurality of physical host machines may run several computing services or microservices, such as applications or sub-parts of an application. The services may execute from virtual machines and/or containers. A service running in a container is referred to herein as a containerized service. Virtual machines are an abstraction of physical hardware of a physical host machine, allowing the hardware of a single physical host machine to be abstracted into multiple virtual machines that share the hardware. A virtual machine itself may run an operating system. Containers are similar to virtual machines, but instead of abstracting the physical hardware, containers are an abstraction at the application layer that package code and dependencies together. Accordingly, multiple containers can run on the same physical host (or even within a virtual machine) and share the operation system kernel with other containers. In certain aspects, containers are therefore an abstraction of the underlying operating system. A container packages an application and dependencies of the application so that the application runs reliably in different computing environments.

Some containerized services may be susceptible to attack by a malicious entity. The malicious entity may further use a compromised containerized service to communicate with other containerized services. Such communication can compromise the other containerized services, and can compromise the computing system as a whole.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for creating one or more firewall rules to regulate communication between containers. The rules of the firewall may be regarded as enforcing a "nano-segmentation" between containerized services. The approach includes calculating a trust score for each container. To generate or maintain a rule for any two containers, a difference between the trust scores is computed, and if the difference in trust levels does not satisfy a threshold (e.g., is too large), then the more trustworthy container is not allowed to communicate with the less trustworthy container. If the difference in trust scores does satisfy the threshold, then the trustworthy container is allowed to communicate with the other trustworthy container, or an untrustworthy container is allowed to communicate with another untrustworthy container.

Figure 1:
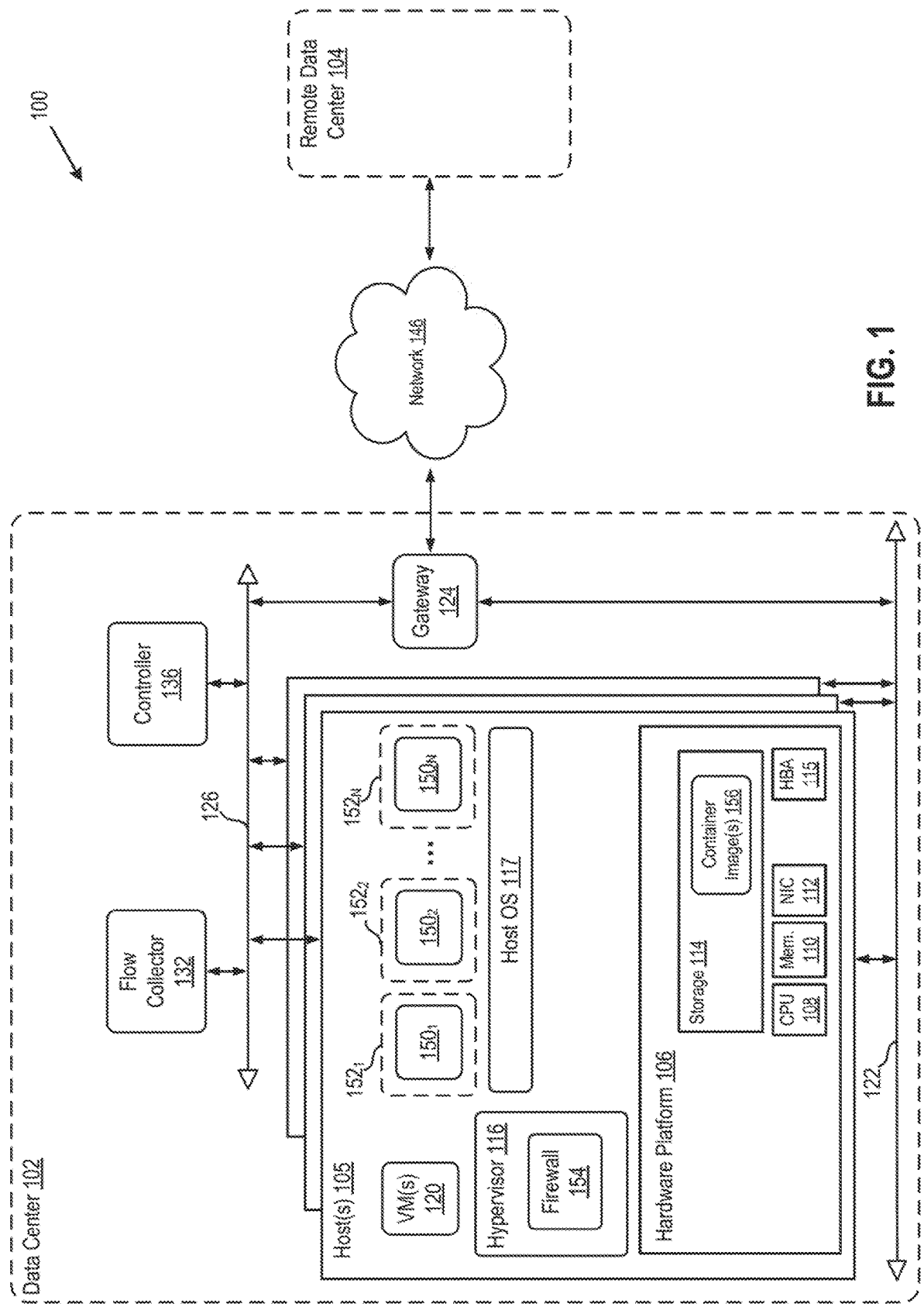
FIG. 1 depicts a block diagram of a computer system in which one or more embodiments of the present disclosure may be utilized, according to an embodiment.

FIG. 1 depicts a block diagram of a computer system 100 in which one or more embodiments of the present disclosure may be utilized, according to an embodiment. Computer system 100 includes data center 102 and a remote data center 104, connected by a network 146. Remote data center 104 may be substantially similar to data center 102. Network 146 may be, for example, a direct link, a local area network (LAN), a wide area network (WAN) such as the Internet, another type of network, or a combination of these.

Data center 102 includes host(s) 105, a gateway 124, a management network 126, a data network 122, a flow collector 132, and a controller 136. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

In certain aspects, host 105 is configured to provide a virtualization layer or virtualization system/software, also referred to as a hypervisor 116, that abstracts processor, memory, storage, and networking resources of hardware platform 106 into one or more multiple virtual computing instances (VCIs) that run concurrently on the same host. For example, VCIs may be virtual machines 120 (collectively referred to as VMs 120 and individually referred to as VM 120) running on hypervisor 116, or VCIs may be containers 150 running on host OS 117.

The hypervisor architecture may vary. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system 117 in the server. In some implementations, the hypervisor may comprise system level software as well as a "Domain 0" or "Root Partition"

virtual machine, which is a privileged machine that has access to the physical hardware resources of the host. In this implementation, a virtual switch, along with hardware drivers, may reside in the privileged virtual machine.

Hypervisor 116 includes an instance of a firewall 154 (e.g., a distributed firewall that is maintained and controlled across multiple hosts 105) that filters network packets arriving at host 105 and outgoing from host 105, e.g., to and from containers 150. Firewall 154 may comprise multiple software modules for filtering network packets by referencing security or firewall settings of firewall 154. All or substantially all hypervisors 116 within system 100 may have a running instance of firewall 154. Firewall 154 may be controlled by rules maintained by a centralized or a distributed controller, such as controller 136.

Hypervisor 116 may comprise a virtual switch (not shown), which serves as an interface between the individual hosted VMs 120, and between hosted VMs 120 and other physical resources available on host 105. Hypervisor 116 may include a tunnel endpoint (VTEP). Each of VM 120 may include a virtual network interface card (VNIC), which is responsible for exchanging packets between the VM 120 and hypervisor 116. A logical overlay network may be implemented for VMs 120 by encapsulating data packets that are generated by VMs 120 for delivery to other hosts 105 through the underlying physical network. The VTEP of the virtual switch may be used when, for example, VMs 120 that are located on different hosts 105 are communicating. The virtual switch may extract packet attributes from packets sent between VMs 120, such as packets sent between containers 150 running within different VMs 120.

Figure 2:
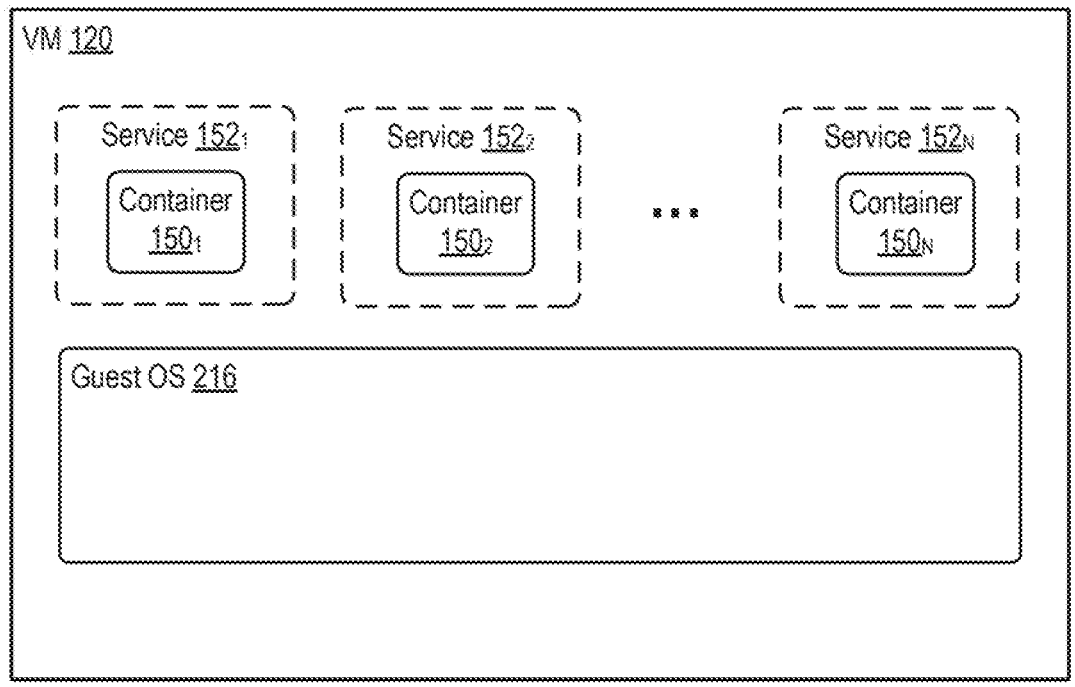
FIG. 2 depicts a block diagram of a virtual machine, according to an embodiment.

In certain aspects, VCIs may be containers 150 (collectively referred to as containers 150 and individually referred to as container 150). In certain aspects, as shown, containers 150 run on top of host operating system 117. Containers 150 may run on top of a host operating system 117, or containers 150 may alternatively or additionally run within one of VMs 120, on top of a guest operating system 216 of that VM 120, as shown in FIG. 2 OS 117 may be a standard operating system such as Microsoft Windows® or Linux®. If containers 150 run outside of a VM 120, on top of OS 117, then an instance of firewall 154 may be located along the data path between the containers 150 and the network, such as data network 122.

A microservice or service 152 may be one or more applications or sub-parts of an application. Container image 156 is a package of software (e.g., a package of one or more services 152 or one or more applications) that contains the service's executable code, system tools, configurations, settings, system libraries, and other dependencies as a single portable object that is executable independently of infrastructure and computing environment (e.g., independently of the type of operating system on which container 150 executes). Container 150 is created by instantiating container image 156 and executing the container image 156. Container image 156 includes the code that executes service 152 associated with container 150. Service 152 may be for example, an application or a sub-part of an application. At runtime, container 150 is an isolated user space in which an application runs directly on the kernel of OS 117. Containers 150 in the same VM 120 or host 105 execute on top of the same OS 117, 216. That is, containers 150 share the same operating system and share the same kernel of an operating system. A container 150 does not comprise its own operating system that is executing within the container 150.

Container image 156 may comprise a file system of container 150 that is launched from that container image 156, and/or a file system of service 152 that executes from that launched container 150, such as for example, the A Union File System (AUFS). In an embodiment, the file system stored within container image 156 is a separate file system than that of the operating system on which container 150 executes. In an embodiment, the file system stored within container image 156 is a stateless file system by default, but the file system stored within container image 156 may retain state if storage volumes are attached and reattached to containers as the containers are created and deleted. The storage volumes may be, for example, logical storage volumes that abstract physical storage.

In an embodiment, the file system stored within container image 156 operates independently of the operation of the file system of OS 117, 216 when accessing data stored within container image 156. In an embodiment, the file system stored within container image 156 does not depend on any configuration of the file system of OS 117, 216 when accessing data stored within container image 156. In an embodiment, the file system stored within container image 156 does not use or make a call to the file system of OS 117, 216 when accessing data stored within container image 156.

Hardware platform 106 of each host 105 may include components of a computing device such as one or more processors (CPUs) 108, system memory 110, a network interface 112, storage system 114, a host bus adapter (HBA) 115, and other I/O devices such as, for example, USB interfaces for connecting external storage or interface devices (not shown).

CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

Storage system 114 represents persistent storage devices (e.g., one or more hard disks, flash memory modules, solid state disks, and/or optical disks). HBA 115 couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random-access memory (DRAM). Non-volatile memory is memory that is persistent (non-volatile). Non-volatile memory is memory that retains its data after having power cycled (turned off and then back on). Nonvolatile memory is byte-addressable, random access nonvolatile memory.

Gateway 124 provides VCIs 120, 150 and other components in data center 102 with connectivity to network 146 used to communicate with remote data center 104. Gateway 124 may manage external public Internet protocol (IP) addresses for VCIs 120, 150, and may route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

Flow collector 132 is a software component of data center 102 that collects container communication flow information (e.g., packet data of packets flowing between containers 150). In an embodiment, network packets sent from a source container 150 to a destination container 150 flow through flow collector 132. Flow collector 132 then extracts packet attributes from the packets. In another embodiment, packets sent from a source container 150 to a destination container 150 flow through devices or service mesh software configured to extract, as metadata, packet attributes from the packets. The devices may be configured to then send the metadata to flow collector 132. The extracted metadata may be in the format of Internet Protocol Flow Information Export (IPFIX). In an embodiment, flow collector 132 collects flow information of a subgroup of containers 150 executing within data center 102, and a second flow collector collects flow information of a second subgroup of containers 150. The flow collection by flow collector 132 may occur as described in U.S. application Ser. No. 16/436,930, incorporated by reference above.

In an embodiment, the device that extracts packet attribute is a switch and/or a router, such as a virtual switch or virtual router. The extracted packet attributes may be, for example, in the form of a five-tuple. Optionally, flow collector 132 and/or the device configured to extract packet attributes time-stamps every five-tuple extracted from a packet. The time-stamping may include associating each five-tuple with the current time, by for example, adding an additional field to the five-tuple to create a six-tuple.

It should be noted that the approach to collecting communication flow information described herein may be an "agentless" approach. For example, in an agent approach, the communication flow information of containers 150 running within host 105 is collected by an agent or component running within that same host 105. In the agentless approach described herein, collection of flow information occurs on a device that is located outside of host 105 on which some or all of the containers 150 are located, the containers 150 being containers for which flow collector 132 is collecting flow information. In the agentless approach, flow collector 132 or the device configured to extract packet attributes collects flow information from containers 150 located across a plurality of hosts 105.

The extracted packet attributes may be, for example, in the form of a five-tuple, and may include (1) source IP address of container 150 from which the packet was sent, (2) source port number from which the packet was sent, (3) destination IP address of container 150 to which the packet was sent, (4) destination port number to which the packet was sent, and (5) protocol identifier. The protocol identifier may identify the protocol used in communication, and the protocol may be, for example, Transmission Control Protocol (TCP) or User Datagram Protocol (UDP). Optionally, every five-tuple extracted and stored by flow collector 132 may be associated with a time to indicate the time when flow collector 132 extracted the five-tuple information. Flow collector 132 may obtain, collect, transmit, and/or store container communication flow information using the IPFIX protocol and format.

Flow collector 132 may be a component of a switch or a router within data center 102. Flow collector may be a component of firewall 154. Flow collector 132 may be a distributed component of data center 132, with instances of flow collector running within a plurality of hosts 105 and/or switches or routers of data center 102. In an embodiment, if flow collector 132 is distributed, instances of flow collector 132 may communicate with one another to share individually collected information. Flow collector 132 may be a centralized component, running within one of hosts 105 or VMs 120, or within a different device.

Controller 136 performs a variety of management functions within data center 102. Controller 136 creates and deletes containers 150, such as when a request to create or delete a container 150 is received by controller 136 from an administrator, or when controller 136 determines that a container 150 should be created or deleted. As used herein, to "create" a container 150 means to instantiate the container 150 from a container image 156. As used herein, to "delete" a container 150 means to delete or close the container 150 so that the container 150 is no longer in a running or executing state. Controller 136 may obtain container images 156 from a registry, and controller 136 may keep track of the source of a container image 156 for later reference. Controller 136 may compute trust scores of containers 150 and may create rules for firewall 154, as discussed below with reference to FIG. 3. Controller 136 stores a record of what containers 150 were created and/or deleted, the IP address of those containers 150, and what service(s) 152 was executing within or from a given container 150. Although controller 136 is described as a single component, functions of controller 136 may be performed by a plurality of components located throughout system 100. Controller 136 may run on a virtual computing instance or as a software module running within a host 105.

Figure 3:
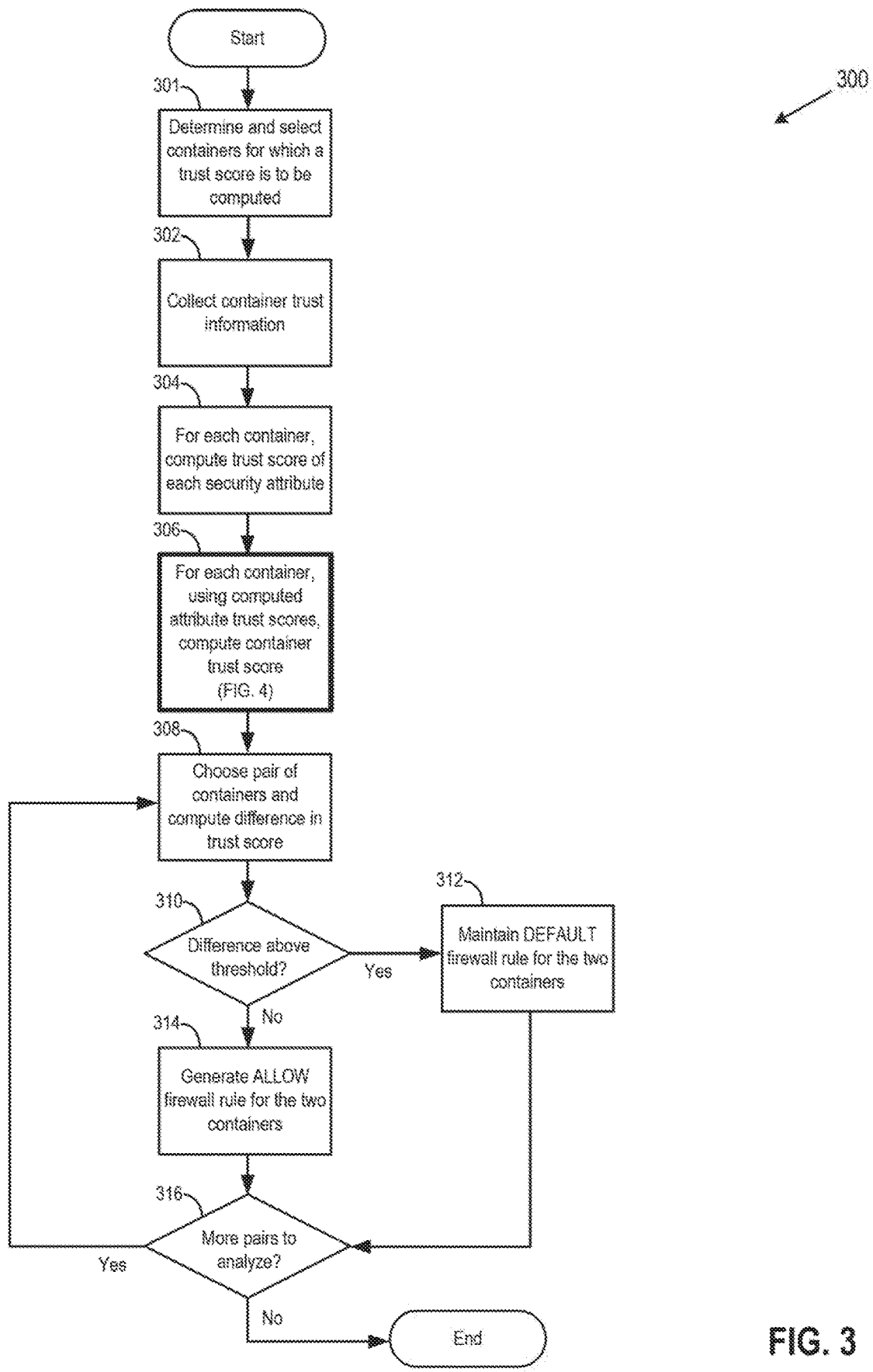
FIG. 3 depicts a flow diagram of a method of creating rules for a firewall based on trust scores of containers, according to an embodiment.

FIG. 3 depicts a flow diagram of a method 300 of creating rules for firewall 154 based on trust scores of containers 150, according to an embodiment. Although blocks of FIG. 3 may be described as performed by controller 136, the blocks may be performed by any component of system 100 that performs the functions described by the blocks.

At block 301, controller 136 determines which containers 150 are to have their container trust scores or "workload" trust scores computed or recomputed. For example, controller 136 may determine that this execution of method 300 is to apply to all containers 150 of data center 102. Controller 136 may determine that method 300 is to apply only to containers 150 of data center 102 for which a trust score was not previously computed, such as computed by a previous execution of method 300. Controller 136 may determine that this execution of method 300 is to apply to containers 150 that already have a trust score, but for which the trust score is to be refreshed by computation of a new container trust score. A container trust score is synonymous with a "workload trust score." A "workload" is one or more services 152 that execute within a container 150.

At block 302, controller 136 obtains information needed to compute a trust score for each container 150 selected at block 301. For example, controller 136 may obtain a list of signatures located within each container image 156, an identifier (e.g., Universal Resource Locator (URL)) of the source registry from which each container image 156 originated, whether the host on which the container image 156 is located and is executing faces a public network, information regarding communication patterns (e.g., packet transmission information) of containers 150 as collected by flow collector 132, and/or other information. The signatures may be digital signatures that cryptographically verify the authenticity of the corresponding executable files.

At block 304, controller 136 computes, for each container 150 selected at block 301, a trust score of one or more of the following security attributes of that container 150: (1) image signature score, (2) image source registry score, (3) container server score, (4) container communication score. Container 150 comprises a set of the above security attributes. As used herein, a set is a collection of objects (e.g., security attributes) that has at least one object. Each security attribute is explained in turn in the following.

The image signature score is a trust score for container image 156 from which container 150 is instantiated. The image signature score may range, for example, from zero to five with zero being the lowest trust level and five being the highest trust level. The image signature score is based on whether a signature is present within container image 156, how many signatures are present, and which signatures are present. A signature may be, for example, a signature performed using a private key of a known and trusted entity. For example, an unsigned container image 156 may receive an image signature score of zero. A self-signed container image 156 may receive an image signature score of one. A third-party-signed container image 156 may receive an image signature score of three.

The image source registry score is a trust score for the location or registry from which container image 156 was obtained. The image source registry score may range, for example, from zero to five with zero being the lowest trust level and five being the highest trust level. The source registry may be recorded by controller 136 when container image 156 is first obtained. Controller 136 may have access to a table or list of known registries along with a trust score for that registry. For example, a registry with a URL address of X may be listed as having a trust level of 5 and thus may receive an image source registry score of 5, while a registry with a URL address of Y may be listed as having a trust level of 2 and thus may receive an image source registry score of 2. An unlisted registry may receive an image source registry score of 0.

The container server score is a trust score indicating the level of risk of host 105 on which container 150 is executing becoming compromised by a malicious entity. For example, if host 105 is accessible through a public network, the container server score may be reduced to indicate the higher risk, and if host 105 is only accessible through private networks within data center 102, then the container server score may be increased to indicate a lower risk. Other facts that may be considered in determining a container server score may be, for example, (a) the patch level of server operating system, (e.g., whether the operating system is up to date), and (b) the presence of security software or modules on host 105, such as for example, AppArmor®. The container server score may range, for example, from zero to five with zero being the lowest trust level and five being the highest trust level.

The container communication score is a trust score indicating whether the container 150 is exposed to or is actively communicating with untrusted or blacklisted destinations. Information (e.g., IP address and port) regarding the destinations with which container 150 has communicated may be obtained from flow collector 132 at block 302. Information regarding untrusted destinations to which container 150 is exposed may be obtained by determining which networks, such as logical networks, are connected to the container 150, and whether these networks are vulnerable to attack by malicious entities. The determining of connected networks may be performed by, for example, inferring connectivity through packet flow information, such as packet flow information collected by flow collector 132. The packet flow information may contain source and destination IP addresses, from which connectivity to networks and components may be determined. Logical networks that are accessible publicly may be determined to be more vulnerable to attack than networks that are accessible only by components within the data center in which container 150 is located, such as by components within data center 102. The container communication score may range, for example, from zero to five with zero being the lowest trust level and five being the highest trust level.

At block 306, using the computed container security attribute trust score(s) of block 304, controller 136 computes a trust score for each container 150 selected at block 301. An example method of calculating a trust score for a container 150 is described in FIG. 4.

Figure 4:
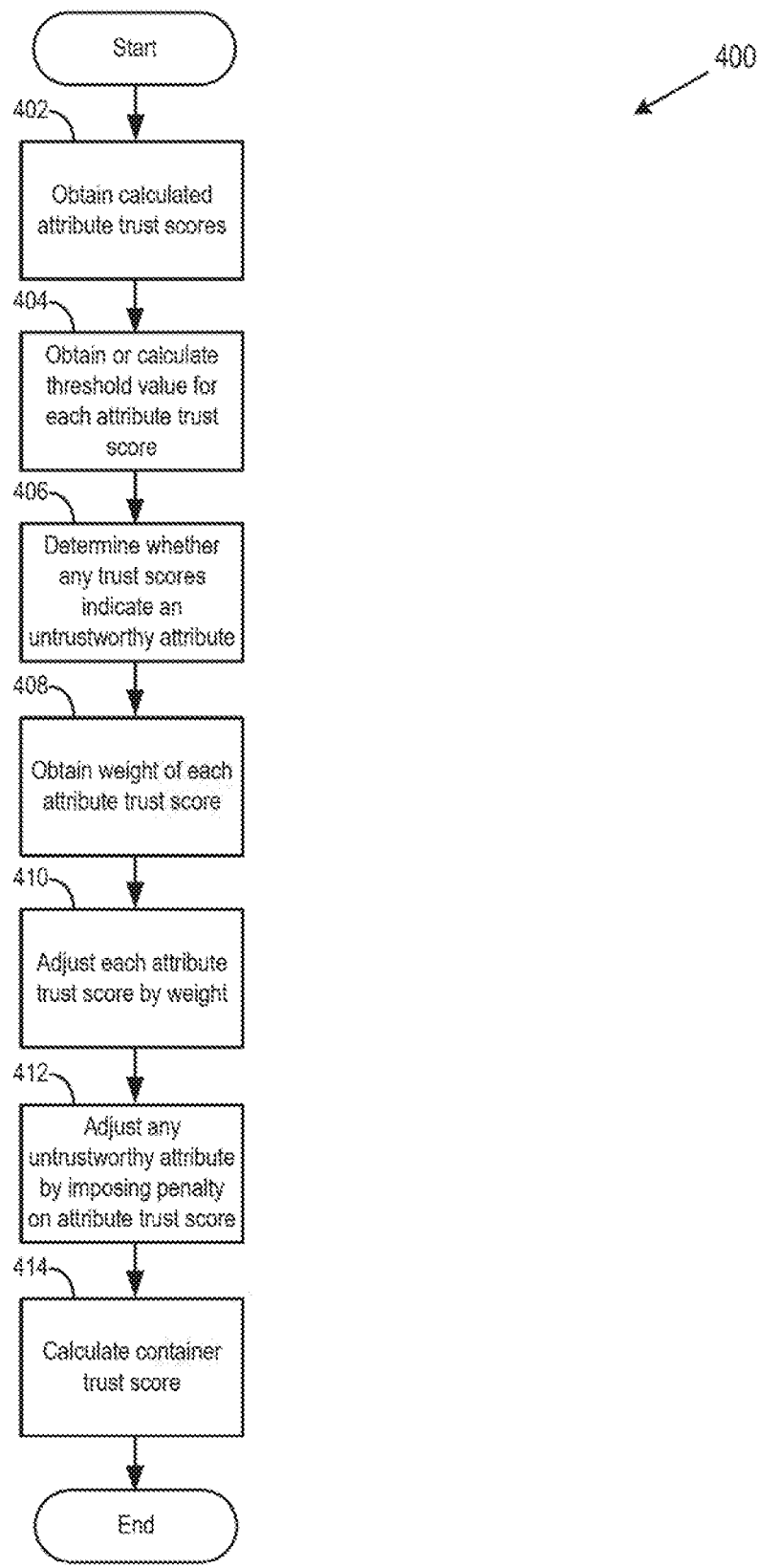
FIG. 4 depicts a flow diagram of a method of calculating a trust score for a container, according to an embodiment.

FIG. 4 depicts a flow diagram of a method 400 of calculating a trust score for a container 150, according to an embodiment. Method 400 is an exemplary method of calculating a trust score, and other methods may be used. Although method 400 is described as using all four security attributes described above, a person of ordinary skill in the art would understand how to apply the below exemplary method of any number or combination of container security attributes, such as less than or more than four, to obtain any number or combination of security trust scores.

At block 402, controller 136 obtains attribute trust scores calculated at block 304 of method 300. For example, on a scale of zero to five, a container 150 may have a computed image signature score of 2, a computed image source registry score of 5, a computed container server score of 5, and a computed container communication score of 5.

At block 404, controller 136 obtains or calculates a threshold value for each attribute trust score. For example, the threshold value of the image signature trust score may be 2.5, such that any image signature score lower than 2.5 indicates that the image signature attribute is an "untrustworthy" attribute, while any image signature score of 2.5 or above indicates that the image signature attribute is a "trustworthy" attribute. The threshold values may be previously determined, such as by an administrator of data center 102, and may be obtained by controller 136, such as from a storage. Alternatively, controller 136 may calculate a threshold value for each container attribute trust score. For example, the threshold value may be the median of all possible values of an attribute trust score. Continuing the example, if an attribute trust score may be one of 0, 1, 2, 3, 4, or 5, then the median value is 2.5, which may be used as the threshold value for the attribute trust score. The threshold value may be the same for each attribute trust score of container 150, or each attribute may vary in the value of its threshold value.

At block 406, controller 136 compares each attribute trust score (e.g., the score computed at block 304 of method 300) to the threshold value of that trust score. If any attribute trust scores are below a threshold value, then the attribute associated with the trust score is marked as an untrustworthy attribute. For example, if the image signature trust score is 2, while the image signature threshold value is 2.5, then the image signature attribute would be determined to be an "untrustworthy" attribute.

At block 408, controller 136 obtains the weight of each attribute. The weight indicates the relative importance of an attribute in calculating the overall workload trust score of container 150. For example, if the container server score is twice as important as the image source registry score, and the image signature score is more than four times more important than that container communication score, then the following weights may be assigned to the attribute trust scores obtained at block 402. The image signature score may be associated with a weight of 0.45, the image source registry score may be associated with a weight of 0.15, the container server score may be associated with a weight of 0.30, and the container communication score may be associated with a weight of 0.1. A weight may range in value, for example, from 0 to 1.

At block 410, each attribute trust score obtained at block 402 is adjusted by the weight obtained at block 408. The adjusting may be performed by, for example, multiplying the attribute trust score by the weight associated with that trust score. The mathematical result of adjusting an attribute trust score may be referred to as a weighted attribute trust score.

At block 412, any untrustworthy attribute is adjusted by penalizing any untrustworthy attributes. The adjusting may be performed by obtaining the weighted attribute trust score, calculated at block 410, of any attribute trust scores determined to be untrustworthy at block 406, and then multiplying that weighted attribute trust score by a negative number. The number may be, for example, −1, −2, −4, −10, or −100. The more attributes a container has, the larger the number may be.

At block 414, controller 136 calculates the workload trust score of container 150. The workload trust score may be calculated by adding all weighted attribute trust scores, as adjusted by the penalty of block 412. After calculating the workload trust score of container 150, controller 136 may store the score, such as within memory 110 or storage 114. After block 414, method 400 ends.

In summary, Table 1 below shows exemplary values for container 150 and an example calculation of a workload trust score using the values in Table 1, as may be performed by method 400.

TABLE 1

| Attribute | Attribute Trust Score | Attribute Threshold | Weight |
| --- | --- | --- | --- |
| image signature | 2 | 3 | 0.45 |
| image source registry | 5 | 3 | 0.15 |
| container server | 5 | 3 | 0.3 |
| container communication | 5 | 3 | 0.1 |

Using the values in Table 1, the workload trust score calculation would be:

$$\text{Workload Trust Score} = (-2*(0.45*2)) + (5*0.15) + (5*0.3) + (5*0.1) = 0.95$$

Returning to FIG. 3, at block 308, controller 136 chooses a pair of containers 150. The containers of the pair may be chosen from the group of containers for which a workload trust score was computed at block 306. The containers of the pair may also be chosen from any container 150 executing on data center 102. For example, one container 150 of the pair may be a container 150 for which a workload trust score was previously computed before block 301 of method 400, such as during a previous execution of method 400, and the second container 150 of the pair may be a container 150 for which a workload trust score was computer at block 306. As part of block 308, controller 136 calculates the difference in trust scores between the two containers. For example, if the trust score of a first container 150 of the pair is 1.7, and the trust score of a second container 150 of the pair is 0.8, then the difference is 0.9.

At block 310, controller 136 determines whether the difference calculated at block 308 satisfies (e.g., is greater than) a difference threshold value for workload trust scores. The difference threshold of block 310 is a different threshold from the attribute threshold discussed above with reference to block 404 of method 400. The difference threshold value may be determined, for example, by an administrator of data center 102, and obtained by controller 136 from storage 114. If the difference between trust scores does not satisfy the threshold, then method 300 continues to block 312. If not, then method 300 continues to block 314.

At block 312, controller 136 generates or maintains one or more default rules for firewall 154, the one or more rules blocking or denying communication between the pair of containers 150 chosen at block 308. The rule(s) may be created in conjunction with firewall 154. The default rule may be set or pre-generated by an administrator of data center 102. The default rule may be, for example, to deny communication or to allow communication between the pair of containers 150 chosen at block 308. The rule may be implemented to be part of firewall 154 by, for example, adding the rule to a database (not shown) of firewall rules, the database being accessible by firewall 154.

At block 314, controller 136 generates one or more rules for firewall 154, the one or more rules allowing communication between the pair of containers 150 chosen at block 308. The rule(s) may be created in conjunction with firewall 154.

At block 316, controller 136 determines whether more pairs of containers 150 that have not been selected at block 308 remain to be selected. If so, then method 308 returns to block 308 and chooses a new pair of containers 150. If not, then method 300 ends.

After method 300 or as part of method 300, a source container 150 sends a packet to a destination container 150. The packet reaches firewall 154. Firewall 154 uses the rule(s) created at blocks 312 and/or 314 to determine whether the packet is to proceed to its destination or to be blocked. Based on the determination, firewall 154 allows the packet to proceed or blocks the packet from proceeding.

Figure 5:
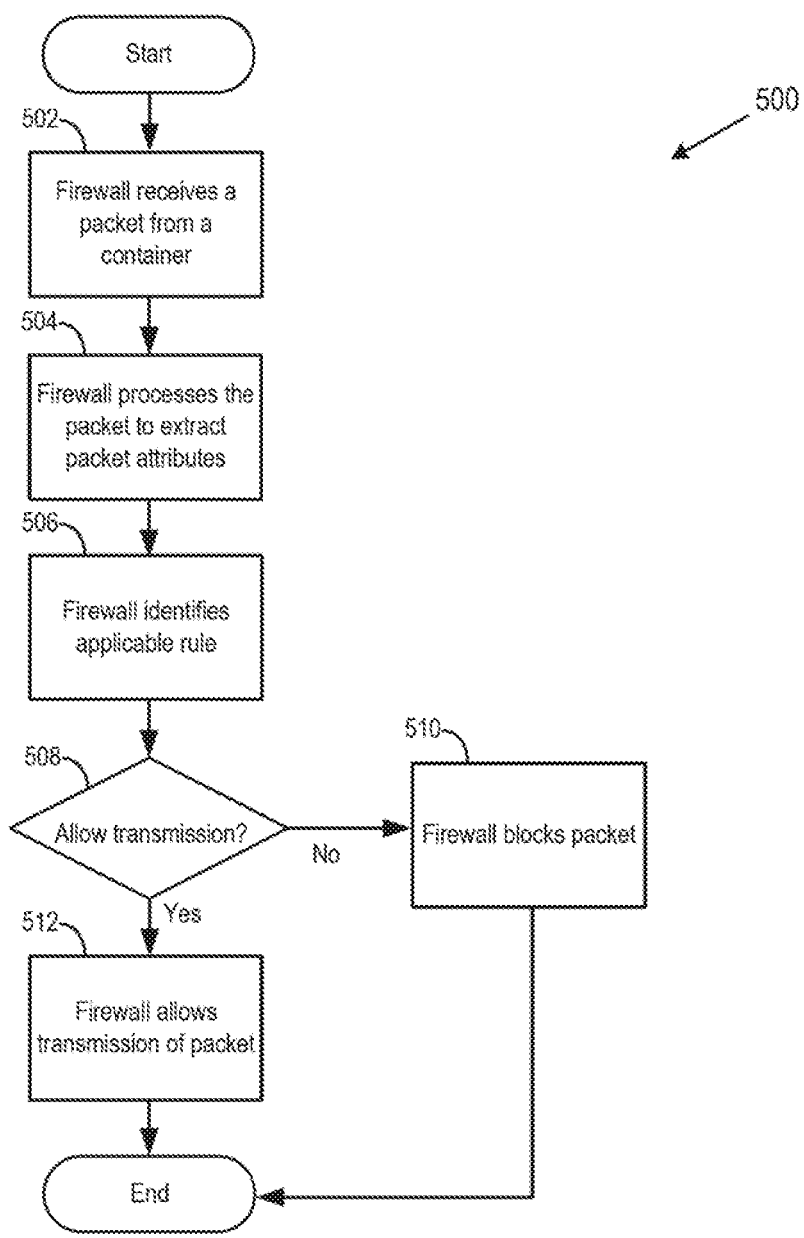
FIG. 5 depicts a flow diagram of processing network packets according to one or more firewall rules, according to an embodiment.

FIG. 5 depicts a flow diagram of processing network packets according to one or more firewall rules generated by method 300, and allowing or blocking the network packets based on the generated rules, according to an embodiment. At block 502, firewall 154 receives a network packet sent by one of containers 150.

At block 504, firewall 154 processes the packet to extract one or more packet attributes. The extracted packet attributes may be, for example, one or more identifiers of the source container 150 and the destination container 150 of the packet. The identifier may be, for example, an IP or a media access control (MAC) address. For another example, extracted packet attributes may include source IP, source port number, destination IP, and destination port number.

At block 506, firewall 154 uses one or more packet attributes extracted at block 504 to identify one or more applicable rules out of a plurality of security rules of firewall 154.

At block 508, firewall 154 compares some or all extracted attributes to the logic of the one or more applicable rules identified at block 508 to determine whether to allow transmission of the packet or to block transmission of the packet. If the packet is to be blocked, method 500 continues to block 510. If the packet is to continue to its destination, then method 500 continues to block 512.

At block 510, firewall 154 blocks transmission of the packet. After block 510, method 500 ends.

At block 512, firewall 154 allows transmission of the packet. After block 512, method 500 ends.

The present approach is a technical solution to a technical problem, with the practical application of improving security of containers that communicate with one another. Improving security of communicating containers is a specific function improving computer technology and the functioning of the computer itself.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). The methodology described herein also applies to "unikernel" containers, which are containers that include a lightweight kernel as part of the container image, do not require a standard general-purpose OS on which to run, and may instead run on a hypervisor rather than the standard general-purpose OS. OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization.

The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of generating or maintaining a firewall rule of a firewall of one or more computer systems, the one or more computer systems including a first container and a second container executing on one or more operating systems, wherein the first container comprises a first set of security attributes, and wherein the second container comprises a second set of security attributes, the method comprising:
   computing one or more first attribute trust scores of at least one of the first set of security attributes;
   computing one or more second attribute trust scores of at least one of the second set of security attributes;
   based on the one or more first attribute trust scores, computing a first workload trust score of the first container;
   based on the one or more second attribute trust scores, computing a second workload trust score of the second container;
   comparing the first workload trust score to the second workload trust score; and
   based on the comparing, generating or maintaining a rule for the firewall to block or allow transmission of packets between the first container and the second container.

2. The method of claim 1, the method further comprising:
   transmitting a packet from the first container to the second container;
   based on the rule, determining by the firewall whether to allow or block transmission of the packet; and
   based on the determining, blocking or allowing transmission of the packet.

3. The method of claim 1, wherein the computing the first workload trust score comprises:
   comparing each score of the first attribute trust scores to an attribute threshold value to determine whether each attribute of the first set of security attributes is a trustworthy attribute;
   adjusting at least one score of the first attribute trust scores by one or more weights;
   based on the comparing, adjusting at least one score of the first attribute trust scores; and
   summing each score of the first attribute trust scores.

4. The method of claim 1, wherein the first container is instantiated from a container image, the method further comprising, prior to the computing the first attribute trust scores, obtaining one or more signatures located within the container image, and wherein the computing the first attribute trust scores is performed using at least one of the one or more signatures or packet transmission information.

5. The method of claim 1, the method further comprising, prior to the computing the first attribute trust scores, obtaining an identifier of a source registry of the first container from which a container image of the first container originated, wherein the computing the first attribute trust scores is performed using at least the identifier.

6. The method of claim 1, the method further comprising, prior to the computing the first attribute trust scores, obtaining packet transmission information of the first container, wherein the computing the first attribute trust scores is performed using at least the packet transmission information.

7. The method of claim 1, wherein a first service runs from the first container, wherein the first container is instantiated from a container image, and wherein the container image comprises executable code, system tools, configurations, settings, system libraries, and file system of the first service.

8. The method of claim 1, the method further comprising:
   receiving, by the firewall, a packet from the first container, the second container, or a third container;
   processing the packet to extract one or more packet attributes;
   comparing the one or more packet attributes to the rule; and
   based on the comparing, allowing or blocking transmission of the packet.

9. A non-transitory computer readable medium comprising instructions to be executed in a processor of one or more computer systems, the instructions when executed in the processor cause the one or more computer systems to carry out a method of generating or maintaining a firewall rule of a firewall of the one or more computer system, the one or more computer system including a first container and a second container executing on one or more operating systems, wherein the first container comprises a first set of security attributes, and wherein the second container comprises a second set of security attributes, the method comprising:
   computing one or more first attribute trust scores of at least one of the first set of security attributes;
   computing one or more second attribute trust scores of at least one of the second set of security attributes;
   based on the one or more first attribute trust scores, computing a first workload trust score of the first container;
   based on the one or more second attribute trust scores, computing a second workload trust score of the second container;
   comparing the first workload trust score to the second workload trust score; and
   based on the comparing, generating or maintaining a rule for the firewall to block or allow transmission of packets between the first container and the second container.

10. The non-transitory computer readable medium of claim 9, the method further comprising:
    transmitting a packet from the first container to the second container;
    based on the rule, determining by the firewall whether to allow or block transmission of the packet; and
    based on the determining, blocking or allowing transmission of the packet.

11. The non-transitory computer readable medium of claim 9, wherein the computing the first workload trust score comprises:

comparing each score of the first attribute trust scores to an attribute threshold value to determine whether each attribute of the first set of security attributes is a trustworthy attribute;

adjusting at least one score of the first attribute trust scores by one or more weights;

based on the comparing, adjusting at least one score of the first attribute trust scores; and summing each score of the first attribute trust scores.

12. The non-transitory computer readable medium of claim 9, wherein the first container is instantiated from a container image, the method further comprising, prior to the computing the first attribute trust scores, obtaining one or more signatures located within the container image, and wherein the computing the first attribute trust scores is performed using at least one of the one or more signatures or packet transmission information.

13. The non-transitory computer readable medium of claim 9, the method further comprising, prior to the computing the first attribute trust scores, obtaining an identifier of a source registry of the first container from which a container image of the first container originated, wherein the computing the first attribute trust scores is performed using at least the identifier.

14. The non-transitory computer readable medium of claim 9, the method further comprising, prior to the computing the first attribute trust scores, obtaining packet transmission information of the first container, wherein the computing the first attribute trust scores is performed using at least the packet transmission information.

15. The non-transitory computer readable medium of claim 9, wherein a first service runs from the first container, wherein the first container is instantiated from a container image, and wherein the container image comprises executable code, system tools, configurations, settings, system libraries, and file system of the first service.

16. The non-transitory computer readable medium of claim 9, the method further comprising:

receiving, by the firewall, a packet from the first container, the second container, or a third container;

processing the packet to extract one or more packet attributes;

comparing the one or more packet attributes to the rule; and based on the comparing, allowing or blocking transmission of the packet.

17. One or more computer systems comprising:

a firewall;

a first container comprising a first set of security attributes;

a second container comprising a second set of security attributes;

one or more operating systems, wherein the first container and the second container are executing on the one or more operating systems; and at least one hardware processor, wherein the at least one hardware processor is programmed to carry out a method of generating or maintaining a firewall rule of the firewall, the method comprising:

computing one or more first attribute trust scores of at least one of the first set of security attributes;

computing one or more second attribute trust scores of at least one of the second set of security attributes;

based on the one or more first attribute trust scores, computing a first workload trust score of the first container;

based on the one or more second attribute trust scores, computing a second workload trust score of the second container;

comparing the first workload trust score to the second workload trust score; and based on the comparing, generating or maintaining a rule for the firewall to block or allow transmission of packets between the first container and the second container.

18. The computer system of claim 17, the method further comprising:

transmitting a packet from the first container to the second container;

based on the rule, determining by the firewall whether to allow or block transmission of the packet; and based on the determining, blocking or allowing transmission of the packet.

19. The computer system of claim 17, wherein the computing the first workload trust score comprises:

comparing each score of the first attribute trust scores to an attribute threshold value to determine whether each attribute of the first set of security attributes is a trustworthy attribute;

adjusting at least one score of the first attribute trust scores by one or more weights;

based on the comparing, adjusting at least one score of the first attribute trust scores; and summing each score of the first attribute trust scores.

20. The computer system of claim 17, wherein the first container is instantiated from a container image, the method further comprising, prior to the computing the first attribute trust scores, obtaining one or more signatures located within the container image, and wherein the computing the first attribute trust scores is performed using at least one of the one or more signatures or packet transmission information.

* * * * *